(12) United States Patent
Nyboer et al.

(10) Patent No.: US 10,570,980 B2
(45) Date of Patent: Feb. 25, 2020

(54) PARTICLE DAMPER SYSTEM AND METHOD

(71) Applicant: Vibracoustic North America L.P., South Haven, MI (US)

(72) Inventors: Brandon M. Nyboer, Holland, MI (US); Otto J. Preikszas, Holland, MI (US); Mark A. Shand, Brighton, MI (US); Paul D. Cottrell, Ortonville, MI (US)

(73) Assignee: VIBRACOUSTIC NORTH AMERICA L.P., South Haven, MI (US)

( * ) Notice: Subject to any disclaimer, the term of this patent is extended or adjusted under 35 U.S.C. 154(b) by 51 days.

(21) Appl. No.: 15/581,866

(22) Filed: Apr. 28, 2017

(65) Prior Publication Data

US 2017/0335915 A1 Nov. 23, 2017

Related U.S. Application Data

(60) Provisional application No. 62/340,251, filed on May 23, 2016.

(51) Int. Cl.
  *F16F 7/01* (2006.01)
  *F16F 15/36* (2006.01)

(52) U.S. Cl.
  CPC .............. *F16F 7/015* (2013.01); *F16F 7/01* (2013.01); *F16F 15/366* (2013.01);
  (Continued)

(58) Field of Classification Search
  CPC .............. F16F 7/015; F16F 2230/0005; F16F 2226/048; F16F 2226/042; F16F 2226/045; F16F 2226/047; F16F 7/01; F16F 15/366
  (Continued)

(56) References Cited

U.S. PATENT DOCUMENTS 3,141,523 A  7/1964 Dickie
4,504,044 A * 3/1985 Shtarkman .............. F16F 13/00
                                             188/268

(Continued)

FOREIGN PATENT DOCUMENTS

FR            3027243 A1   4/2016
WO       WO-98/12449 A2   3/1998

OTHER PUBLICATIONS

International Search Report PCT/US2017/032312, dated Aug. 1, 2017.

*Primary Examiner* — Pamela Rodriguez
(74) *Attorney, Agent, or Firm* — Fishman Stewart PLLC

(57) ABSTRACT

An assembly for damping the movement of a vibrating body includes an energy dissipating material, a vessel, and a seal. The energy dissipating material may include one or more types of loose particles. The loose particles may include similar and/or dissimilar materials or a mixture thereof. The loose particles may at least partially fill the vessel. The vessel may be configured to conform to requirements of an environment of the vibrating body and to retain and/or store the loose particles. The seal may include a molded material, a plate, and/or a flange. In an embodiment, the plate may be at least partially encompassed within the seal, and the seal, plate, and/or flange may be configured to engage the vessel and/or to retain the loose particles within the vessel.

12 Claims, 6 Drawing Sheets

(52) U.S. Cl.
CPC ... *F16F 2226/042* (2013.01); *F16F 2226/045* (2013.01); *F16F 2226/047* (2013.01); *F16F 2226/048* (2013.01); *F16F 2230/0005* (2013.01)

(58) Field of Classification Search
USPC ............ 188/268, 269, 267.1; 267/140.4, 141
See application file for complete search history.

(56) References Cited

U.S. PATENT DOCUMENTS

| | | | | |
|---|---|---|---|---|
| 4,576,366 | A * | 3/1986 | Gallas | F16F 13/08 188/268 |
| 6,547,049 | B1 * | 4/2003 | Tomlinson | F01D 25/04 188/379 |
| 6,955,250 | B2 * | 10/2005 | Kreider | F16F 7/01 188/268 |
| 7,311,500 | B2 * | 12/2007 | Rongong | F01D 5/147 416/230 |
| 8,794,586 | B2 * | 8/2014 | Rodecker | F01N 13/1805 180/296 |
| 2014/0054005 | A1 | 2/2014 | Stewart et al. | |

\* cited by examiner

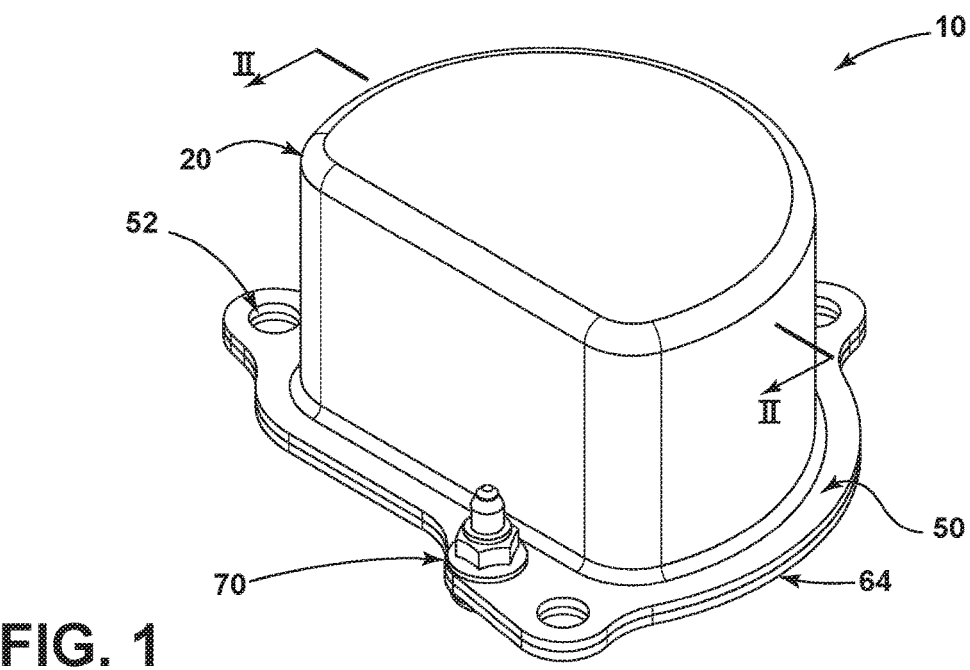
FIG. 1
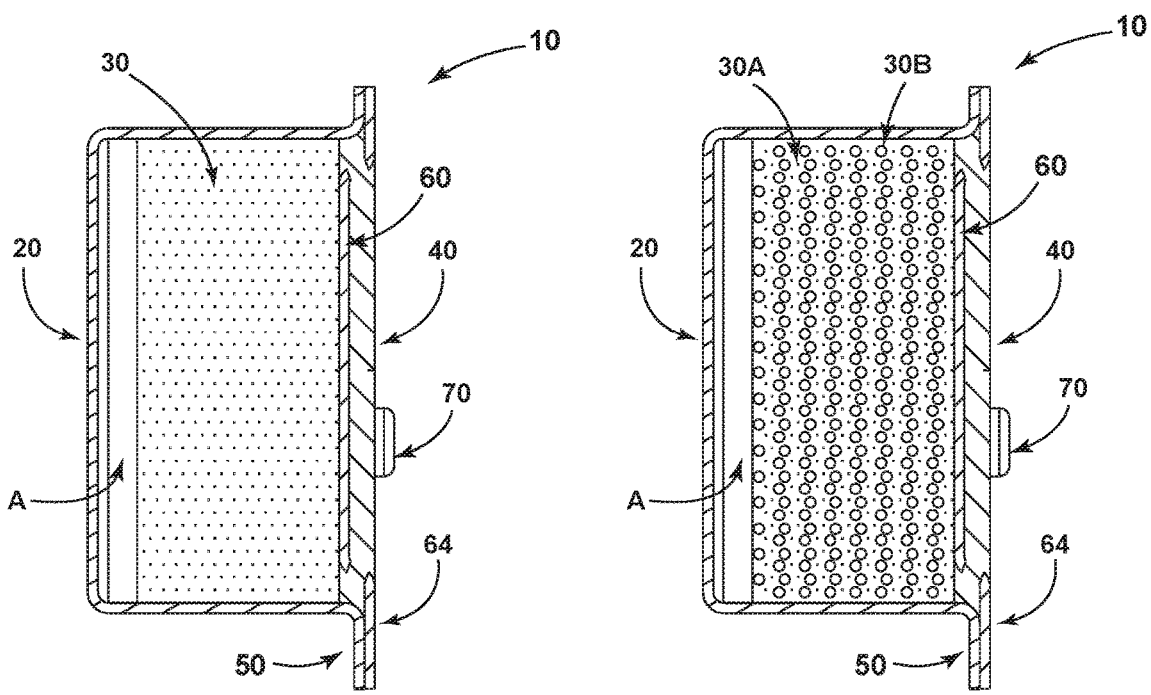
FIG. 2A
FIG. 2B

PARTICLE DAMPER SYSTEM AND METHOD

CROSS-REFERENCE TO RELATED APPLICATIONS

This application claims the benefit of U.S. provisional application No. 62/340,251, filed May 23, 2016 (the '251 application). The '251 application is hereby incorporated by reference as though fully set forth herein.

BACKGROUND a. Technical Field

The present disclosure relates to particle dampers and damping systems, including methods and systems involving particle dampers.

b. Background Art

This background description is set forth below for the purpose of providing context only. Therefore, any aspects of this background description, to the extent that it does not otherwise qualify as prior art, is neither expressly nor impliedly admitted as prior art against the instant disclosure.

A device (e.g., an engine) may produce vibration and/or other undesired movements during operation. A particle damper may be configured to be attached to an engine to reduce and/or minimize vibration and/or other undesired movements. Particle dampers may be configured for attachment to an engine such that there is limited clearance with respect to surrounding engine components. Particle dampers may include a vessel containing an energy dissipating material (e.g., loose particles).

The foregoing discussion is intended only to illustrate the present field and should not be taken as a disavowal of claim scope.

SUMMARY

In an embodiment, an assembly for damping the movement of a device includes a vessel configured to store an energy dissipating material, a seal configured to engage the vessel and/or retain the energy dissipating material within the vessel, the seal including a plate that may be configured to engage the vessel.

The foregoing and other aspects, features, details, utilities, and advantages of the present disclosure will be apparent from reading the following description and claims, and from reviewing the accompanying drawings.

BRIEF DESCRIPTION OF THE DRAWINGS

FIG. 1 is an isometric view generally illustrating an embodiment of a particle damper in accordance with teachings of the present disclosure.

FIGS. 2A and 2B are cross-sectional side views generally illustrating embodiments of a particle damper in accordance with teachings of the present disclosure.

DETAILED DESCRIPTION

Figure 3:
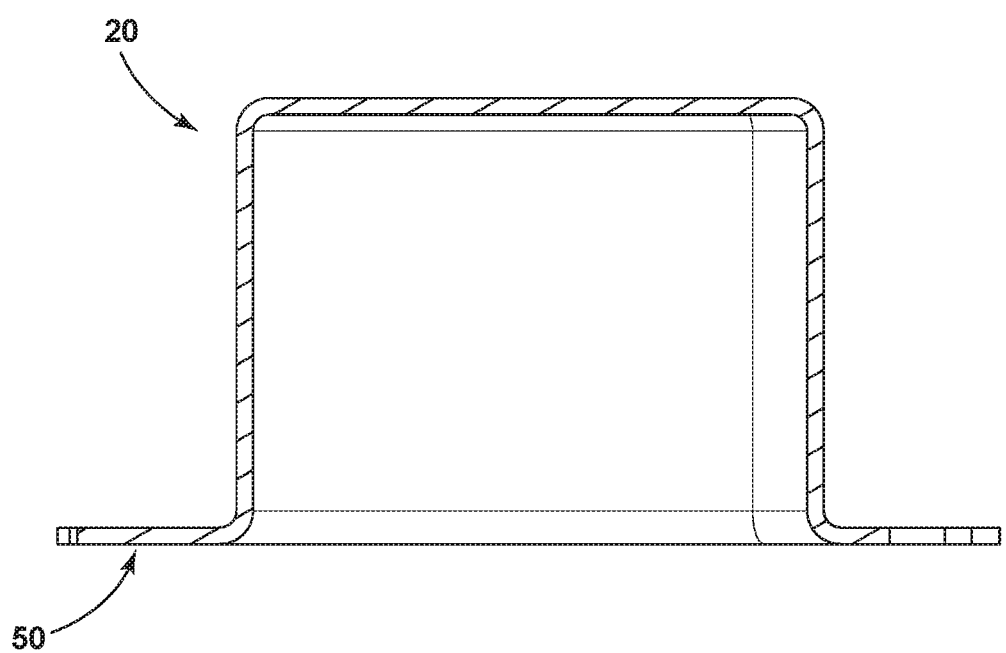
FIG. 3 is a cross-sectional side view generally illustrating an embodiment of a vessel in accordance with teachings of the present disclosure.
Figure 4:
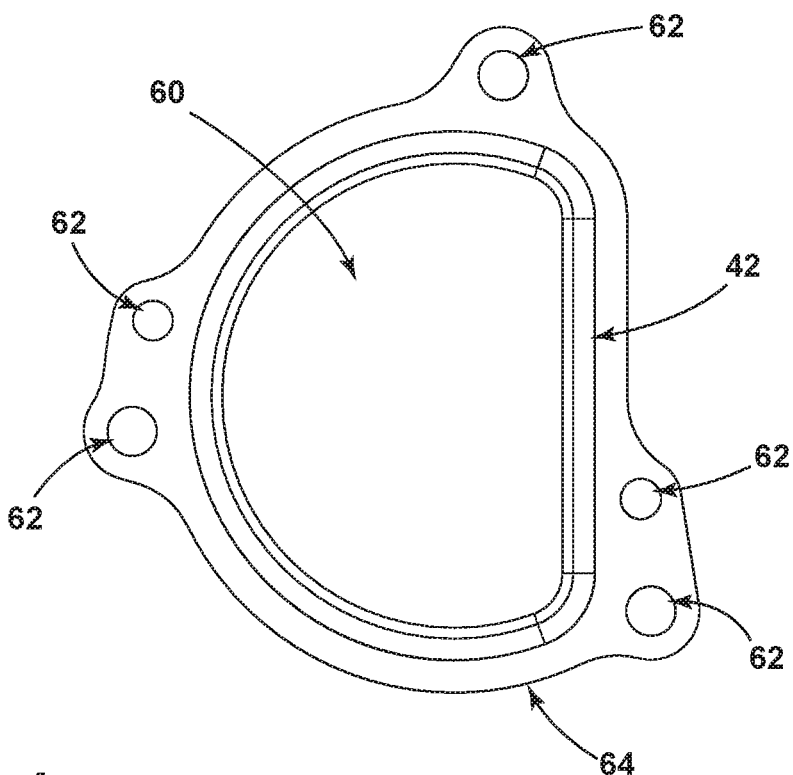
FIG. 4 is a top plan view generally illustrating an embodiment of a vessel in accordance with teachings of the present disclosure.
Figure 5:
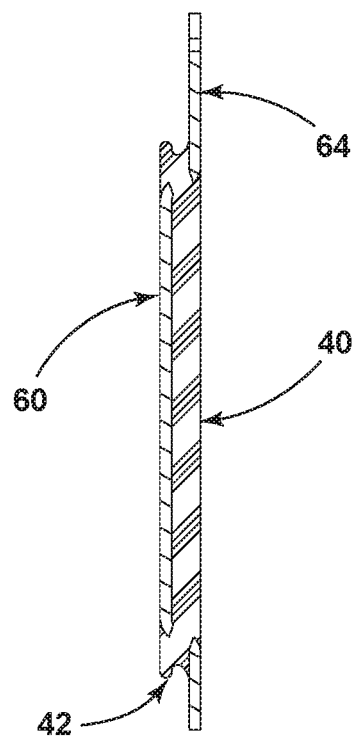
FIG. 5 is a cross-sectional side view generally illustrating an embodiment of a plate and seal in accordance with teachings of the present disclosure.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It will be appreciated that for conciseness and clarity, spatial terms such as "vertical," "horizontal," "up," and "down" may be used herein with respect to the illustrated embodiments. However, the disclosed devices may be used in many orientations and positions, and these terms are not intended to be limiting or absolute.

Referring now to the drawings wherein like reference numerals are used to identify identical or similar components in the various views, FIGS. 1-12 generally illustrate a particle damper 10, 10' and related components. In embodiments, particle damper 10, 10' may include a vessel 20, 20' a vessel flange 50, a plate 60, a seal 40, a seal flange 64, and/or at least one fastener 70. In embodiments, vessel 20, 20' may be configured to contain one or more damping materials/contents, hereinafter referred to as loose particles 30, 30A, 30B. In embodiments, seal 40 may be configured to engage and/or seal vessel 20, 20' and/or to retain loose particles 30 within vessel 20, 20'. In embodiments, seal 40 may be configured to engage vessel flange 50 via seal flange 64. As generally illustrated, for example in FIGS. 4-8, seal 40 may include a sealing surface 42 and/or a plate 60 that may be configured to engage at least a portion of vessel 20. In some embodiments, fastener 70 may secure vessel 20 via vessel flange 50 to seal flange 64 via one or more holes 52 and/or to a device (e.g., an engine). In other embodiments, vessel 20 via vessel flange 50 may be connected to seal flange 64 via mechanical joining techniques (e.g., clinching, press-joining, sonic welding).

Figure 9:
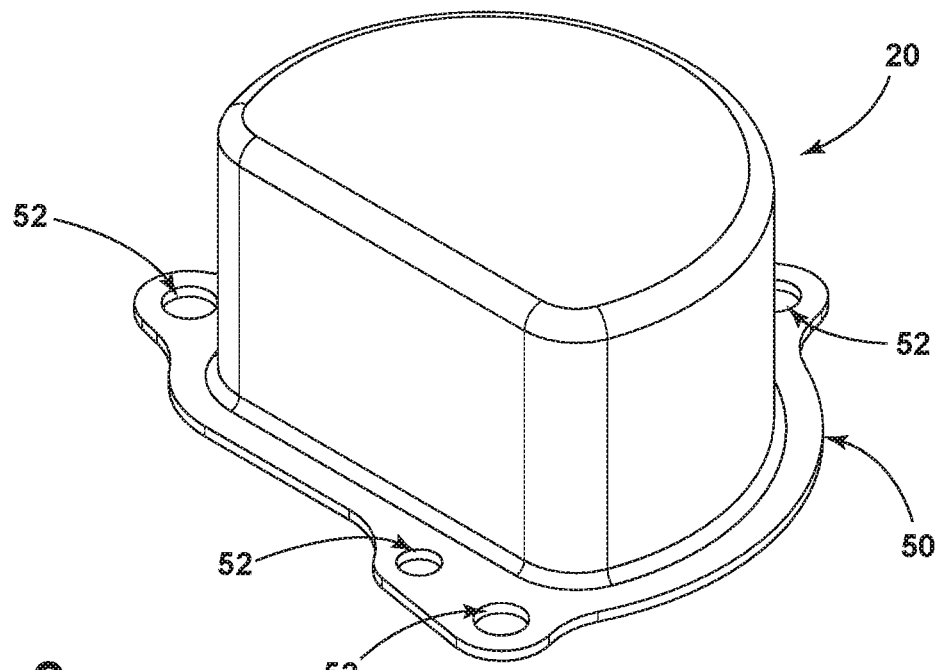
FIG. 9 is a perspective view generally illustrating an embodiment of a vessel in accordance with teachings of the present disclosure.
Figure 10:
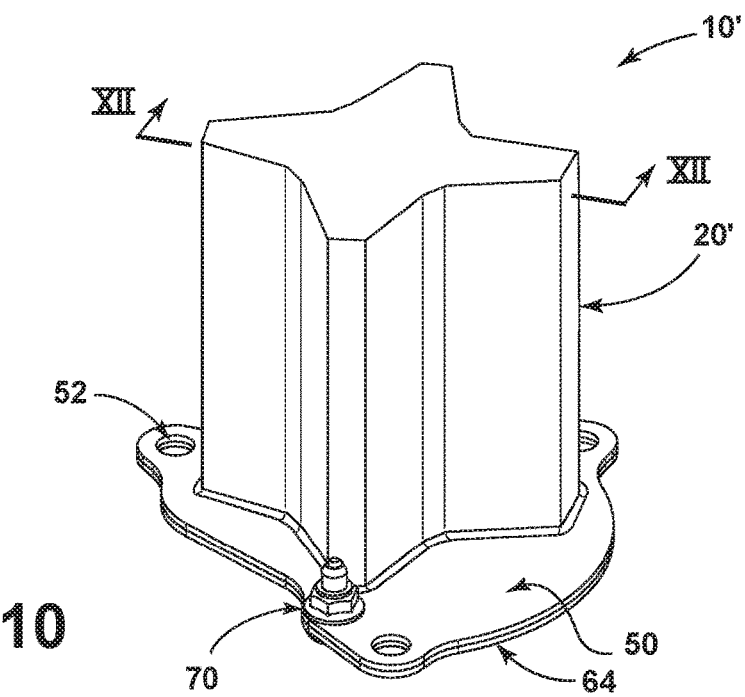
FIG. 10 is an isometric view generally illustrating an embodiment of a vessel in accordance with teachings of the present disclosure.

FIGS. 3 and 9 generally illustrate a vessel 20 of a particle damper 10. Vessel 20 may be constructed of a ductile material (e.g., steel) such that vessel 20 may be formed using suitable techniques (e.g., drawing, stamping). In embodiments, vessel 20 of a particle damper 10 may be constructed of a moldable material (e.g., a polymer and/or composite). In embodiments, vessel 20 may be formed using various suitable techniques (e.g., injection molding). In embodiments, vessel 20 may be configured in shapes that, for example, may conform to intended environment or surroundings (e.g., an engine compartment). In embodiments, vessel 20' may be formed in a complex (e.g., multiple-sided, variable-sided, non-cylindrical) shape, as shown in FIG. 10. In embodiments, vessel 20, 20' may be configured to avoid and/or minimize contact with portions of a device (e.g., an engine) and/or device components that may be attached to and/or in proximity to the device (e.g., engine-driven accessories, intake/exhaust components, control systems, and/or cooling systems). It should be understood that particle damper 10, 10' may be used (e.g., attached) to other devices and/or systems that may experience vibration and/or other undesired movement and that the term "engine" is used herein merely as an example of but one non-limiting application for particle damper 10, 10'.

In embodiments, vessel 20, 20' may be constructed or formed via a drawn stamping of a ductile material (e.g., steel). In embodiments, the configuration (e.g., size and/or shape) of vessel 20, 20' may be affected and/or impacted, at least in part, by the intended installation environment (e.g., surroundings). For example and without limitation, vessel 20, 20' may be configured or shaped (e.g., contoured) in a non-cylindrical and/or multi-sided form to facilitate use and/or placement at a desired location and/or orientation. The desired location and/or orientation may be determined using computer analysis (e.g., finite element analysis) and/or testing (e.g., vibration testing). In embodiments, components of particle damper 10, 10', such as, but not limited to, vessel flange 50, may be designed and/or configured (e.g., sized and shaped) to be mounted and/or fit in and/or around adjacent objects, that may, for example, include one or more engine components.

FIGS. 1, 2A, 2B, 3, and 9 generally illustrate a vessel 20 of an embodiment of a particle damper 10 that may include a vessel flange 50. In embodiments, vessel flange 50 may be formed together with vessel 20, such as, but not limited to, via a drawing operation. Additionally and/or alternatively, vessel flange 50 may be included in the formation of vessel 20 via other processes (e.g. welding, stamping). In embodiments, vessel flange 50 may include one or more holes 52. In embodiments, holes 52 may be configured to receive one or more fasteners 70 that may join vessel 20 and/or vessel flange 50 to seal 40 and/or seal flange 64. In embodiments, holes 52 may permit the use of one or more fasteners 70 (e.g., bolts and nuts, screws). Additionally and/or alternatively, holes 52 may be substituted with (e.g., replaced by) other attachment devices and/or techniques (e.g., welding, riveting, adhesives, clinching, press-joining). In embodiments, vessel flange 50 may also include additional holes 52 that may permit vessel 20 of particle damper 10 to be secured (e.g., affixed to) a surface, such as a surface of an engine. Again, as used herein, the term "engine" refers to not only engines but also to any other parts or components that may reside in or along or may be attached to, for example, an engine, an engine compartment, or a vehicle driveline or compartment. Holes 52 of vessel flange 50 may align with (e.g., correspond to) holes 62 of seal flange 64 (as shown in FIGS. 2A 2B, 4-8, 11, and 12). In embodiments, at least one hole 52 may join vessel flange 50 and seal flange 64 and/or be configured to secure particle damper 10 to a device (e.g., an engine). It should be understood that holes 52 and 62 and/or fasteners 70 may be substituted with, or supplemented by, other suitable connection devices and/or systems, such as, without limitation, adhesives, rivets, and/or welding.

FIGS. 2A and 2B generally illustrate a vessel 20 of an embodiment of a particle damper 10 that may be configured to receive loose particles 30. In embodiments, vessel 20 may include and/or be treated with a corrosion-resistant or other coating (not shown but may comprise, e.g., galvanizing or other surface treatment, and/or one or more films or insert) on the inside and/or outside of vessel 20. In embodiments, the coating may reduce and/or minimize undesired sound(s) that may be produced via the movement of loose particles 30 disposed within vessel 20. In embodiments, the coating that may reinforce (e.g., strengthen) vessel 20 and/or help it resist wear (e.g., abrasion) that may result from the movement of loose particle 30 disposed within vessel 20.

In embodiments, a vessel 20 of a particle damper 10 may include loose particles 30 disposed and/or contained in a vessel 20. Loose particles 30 (see, e.g., FIG. 2A) may, for example, include generally spherical particles, such as, but not limited to, ball bearings. In embodiments, loose particles 30 may be configured in other geometric shapes (e.g., cylinders) and/or randomized shapes (e.g., a mixture of regular and/or irregular shapes). In embodiments, loose particles 30 may be of substantially the same size (e.g., 1.9 mm diameter spheres). In embodiments, loose particles 30 may be more than one size (e.g., 1.9 mm diameter spheres and 2.5 mm diameter spheres).

In embodiments, a vessel 20 of a particle damper 10 may include loose particles 30 in one or more forms and/or shapes. In an embodiment, particle damper 10 may include loose particles 30A (e.g., 1.9 mm diameter spheres) and loose particles 30B (e.g., 2.5 mm diameter spheres) shown in, for example, FIG. 2B. In an embodiment including loose particles 30A and 30B, the respective loose particles 30A and 30B may be present in equal amounts within vessel 20. In another embodiment, loose particles 30A and 30B may be present in unequal amounts (e.g., 35% loose particles 30A, 55% loose particles 30B, and 10% air "A"). In other embodiments, a vessel 20 of a particle damper 10 may include loose particles in other/different shapes and/or sizes, such as loose particles 30A (e.g., 1.9 mm diameter spheres) and loose particles 30B (e.g., 2.5 mm diameter cylinders). In an embodiment including loose particles 30A and 30B, the respective loose particles 30A and 30B may be present in equal amounts within vessel 20. In another embodiment, loose particles 30A and 30B may be present in unequal amounts (e.g., 40% loose particles 30A and 60% loose particles 30B). It should be understood that loose particles 30 may be of more than one shape and/or size. It should also be understood that loose particles 30 may be configured in other ratios.

In an embodiment, loose particles 30 may be spheres configured of metal (e.g., cast iron, stainless steel), such as, but not limited to, ball bearings. Alternatively, loose particles 30 may be cylinders configured of metal, such as, but not limited to, segments of wire and/or rods. In embodiments, loose particles 30 may, if appropriate, include polymers and/or composites. In embodiments, loose particles 30 may be configured with layers of materials, such as, but not limited to, a metal core coated with a polymer. In embodiments, loose particles 30 may include a mixture of shapes and/or configurations. For example and without limitation, loose particles 30 may include a combination (e.g., ratio) of cast iron spheres to polymer coated cylinders.

In embodiments, loose particles 30 may fill at least a portion of vessel 20, such as, for example and without limitation, 90% of the volume of vessel 20. The remaining portion of vessel 20, 10% in this example, may include air "A" or some other fluid trapped or sealed (e.g., at atmospheric pressure) within vessel 20 by a seal 40. In embodiments, another medium may, additionally or alternatively, be included in vessel 20. For example, an inert gas, such as nitrogen, may be included in vessel 20 along with loose particles 30. An inert gas may help prevent and/or retard the formation of corrosion (e.g., deterioration) of loose particles 30. In embodiments, air "A" may be at a pressure higher or lower than atmospheric pressure.

Figures 11, 12:
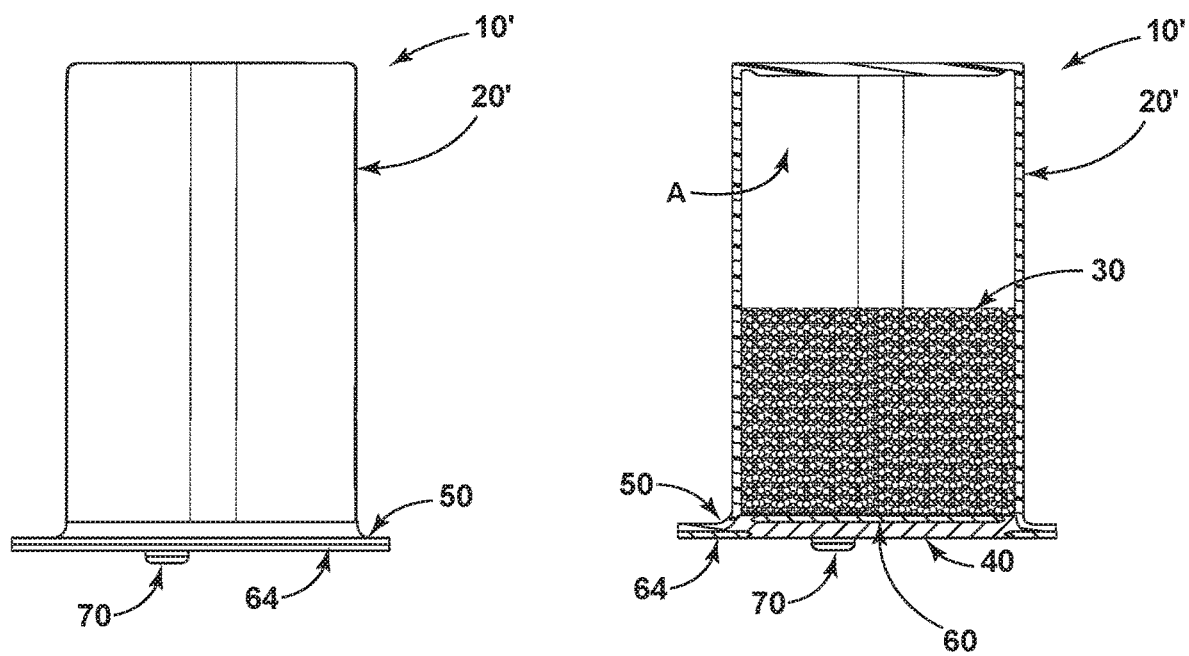
FIG. 11 is a side view generally illustrating an embodiment of a vessel in accordance with teachings of the present disclosure.
FIG. 12 is a cross-sectional view taken along line XII-XII in FIG. 10 and generally illustrating an embodiment of a vessel in accordance with teachings of the present disclosure.

In embodiments, loose particles 30 may be deposited (e.g., poured) into vessel 20, 20'. In an embodiment, loose particles 30 may be poured into vessel 20 until the particle damper 10 is functionally full (e.g., no space is essentially remaining in the vessel 20). In an embodiment, loose particles 30 may be poured into vessel 20, 20' to a point less than full (e.g., 90% full, 50% full) (as shown in FIGS. 2A and 2B, and FIG. 12, respectively). In embodiments, a mixture of at least two types (e.g., shapes) of loose particles 30 may be poured into vessel 20. In embodiments, loose particles 30 may include a liquid/loose particle mixture (e.g., slurry). In embodiments, loose particles 30 may comprise a semi-solid material. It should be understood that loose particles 30 may include other mixtures and/or types of material, including liquids, pastes, solutions, suspended particles, colloid mixtures. The examples described herein are merely exemplary and not limiting. In embodiments, loose particles 30 may be a homogeneous or heterogeneous mixture, or a mixture of the two thereof.

FIGS. 2A, 2B, 4-8, and 12 generally illustrate a seal 40 for an embodiment of particle damper 10, 10'. In embodiments, seal 40 may be configured in a rubber material (e.g., ethylene propylene diene monomer (EPDM)) and/or natural rubber compounds, or a mixture thereof. In embodiments, seal 40 may be formed (e.g., over-molded) with a seal plate 60 and/or a seal flange 64. In embodiments, seal flange 64 may include one or more holes 62. In embodiments, seal flange 64 may include one or more holes 62 that may generally correspond to (e.g., align with) one or more corresponding holes 52 in vessel flange 50. Additionally and/or alternatively, seal plate 60 may include one or more holes 62 that may not correspond to one or more holes 52 in vessel flange 50. In embodiments, one or more holes 62 of seal flange 64 may be used at least in part to secure particle damper 10, 10' to a device (e.g., an engine).

Figure 6:
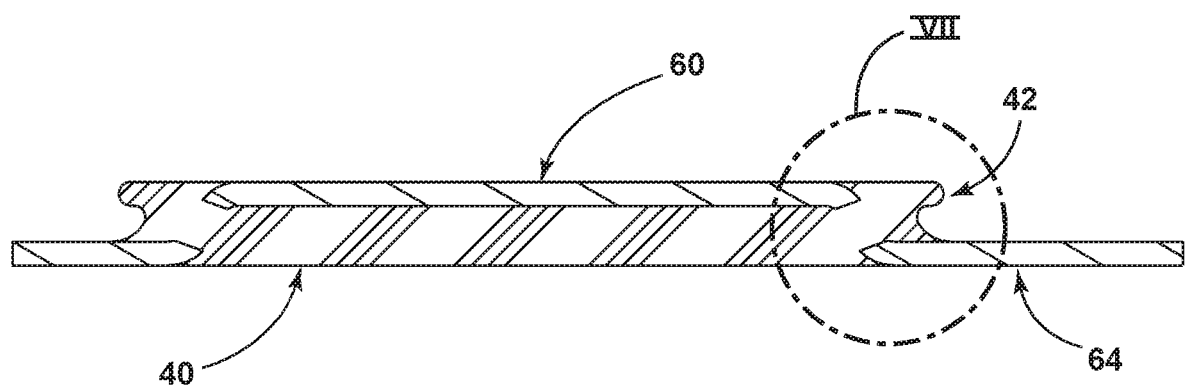
FIG. 6 is a cross-sectional side view generally illustrating an embodiment of a plate and seal in accordance with teachings of the present disclosure.
Figure 7:
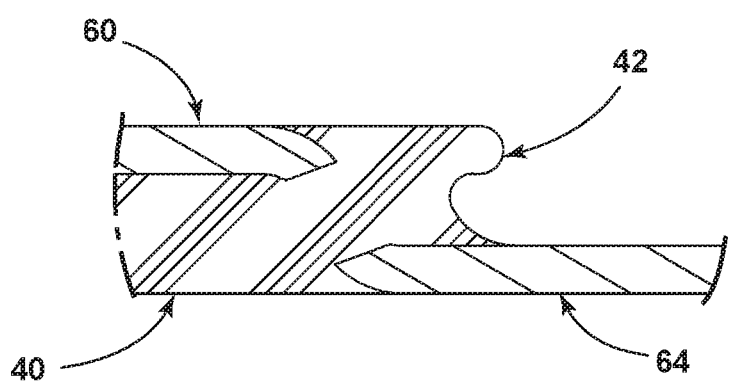
FIG. 7 is an enlarged, fragmentary view of the portion of the plate and seal shown in the dashed circle VII in FIG. 6.
Figure 8:
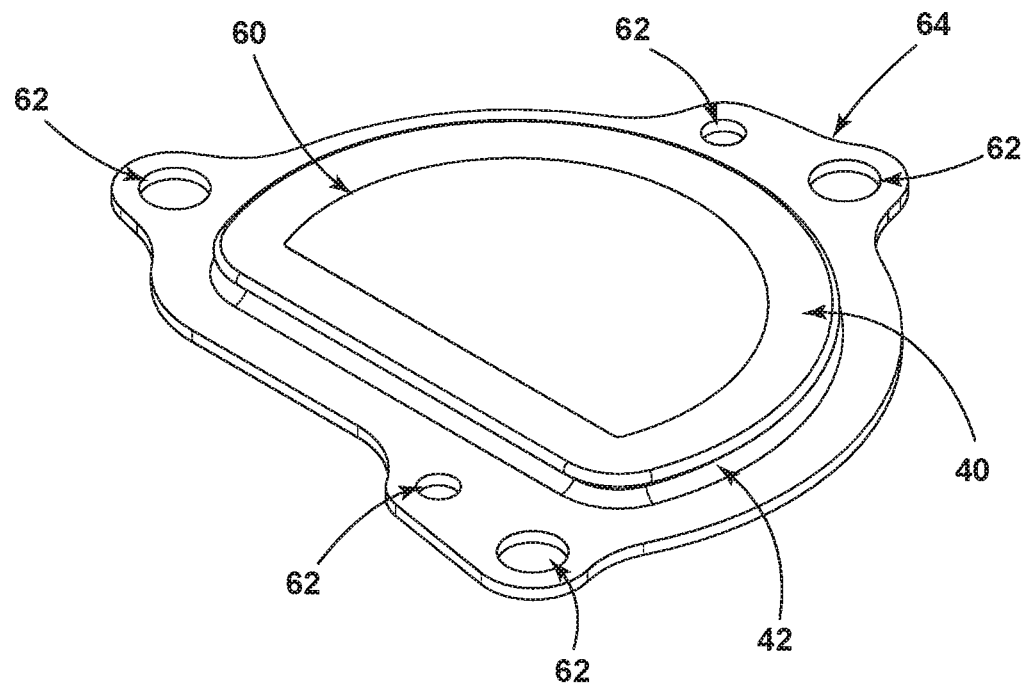
FIG. 8 is a perspective view generally illustrating an embodiment of a plate and seal in accordance with teachings of the present disclosure.

In embodiments, seal 40 of particle damper 10, 10' may include a sealing surface 42 (as shown in FIG. 6, denoted by circle VII, and enlarged in FIG. 7). In embodiments, sealing surface 42 may be configured to seal against (e.g., engage) an interior surface of a vessel 20, 20'. In embodiments, sealing surface 42 may be configured to deform and/or deflect against at least the interior surface of vessel 20, 20' (as shown in FIGS. 2A and 2B, and FIG. 12), such that seal 40 and/or sealing surface 42 may prevent loose particles 30 from escaping vessel 20, 20' despite irregularities (e.g., manufacturing variations or fluctuations) associated with a vessel 20, 20'. In embodiments, seal 40 may include an adhesive (e.g., sealant) that may be applied to engage vessel 20. In embodiments, an adhesive may, in some instances, assist seal 40 and/or sealing surface 42 in preventing loose particles 30 from escaping vessel 20 despite irregularities (e.g., manufacturing variations and/or fluctuations) associated with vessel 20.

In embodiments, a particle damper 10 may include a seal 40. In embodiments, seal 40 may be comprised of a rubber, such as EPDM rubber and/or a natural rubber material, or a mixture thereof. In embodiments, seal 40 may be formed using a molding apparatus (e.g., injection molding apparatus). In embodiments, seal 40 may be formed using a die cutting or other suitable apparatus. In embodiments, seal 40 may include a plate 60. In embodiments, plate 60 may be over-molded by seal 40 such that plate 60 is at least partially covered by (e.g., integrated with) seal 40. In embodiments, seal 40 may include (e.g., be integrated with) a seal flange 64. In embodiments, seal flange 64 may include one or more holes 62. As detailed above, seal flange 64 may include one or more holes 62 that may generally correspond to (e.g., align with) one or more corresponding holes 52 in vessel flange 50. Additionally and/or alternatively, seal plate 60 may include one or more holes 62 that may not correspond to one or more holes 52 in vessel flange 50. In embodiments, seal 40 may be configured to engage vessel 20, 20' and/or vessel flange 50 via sealing surface 42 and/or seal flange 64.

The disclosure envisions and includes methods and methodologies that can permit a manufacturer of particle damper 10 to create an almost limitless number of configurations and/or geometries of particle damper 10. For example and without limitation, a particle damper 10 (including vessel 20 and seal 40) may be designed/configured to clear or "fit" within an engine compartment or various other environments in which a particle damper 10 may be utilized. Moreover, the use of a seal 40 comprising a rubber (or rubber-like) mold bonded sealing system, such as disclosed herein, can help account for, or "take up," manufacturing variations associated with components of particle damper 10, while also providing a seal 40 from fluids or other materials that might corrode and/or otherwise detrimentally affect loose particles 30 inside a particle damper 10. In an embodiment of the method/system, an environment (e.g., an engine compartment) may be identified and the relevant data and dimensions can be obtained. A particle damper 10'—which may have a non-standard (e.g., non-cylindrical) configuration—may be designed to be operationally disposed in the intended environment (as shown in FIG. 10). The vessel 20, 20' (including vessel flange 50) and seal 40 (including plate 60 and seal flange 64) may then be formed/produced (e.g., from drawn steel and mold bonded rubber, respectively) to fit the intended environment. Loose particles 30 may be added to the particle damper 10, 10' and the particle damper 10, 10' may be sealed and placed (e.g., installed) into the intended environment.

There are conventional applications for embodiments of particle damper 10, 10'. However, an unusual (e.g., non-cylindrical) shape may require the machining (e.g., manufacturing) of components of particle damper 10, 10' such as vessel flange 50 and/or seal flange 64 that may have perfectly flat interfaces to seal loose particles 30 within vessel 20, 20' of particle damper 10, 10' and keep undesirable elements out of vessel 20, 20' of particle damper 10, 10'. The present disclosure provides a system and method for forming simple shaped and/or complex (e.g., asymmetrical) particle damper 10, 10' and its components as detailed herein, but without necessarily requiring the time and/or expense of machining and/or manufacturing that might otherwise be employed.

Although only certain embodiments have been described above with a certain degree of particularity, those skilled in the art could make numerous alterations to the disclosed embodiments without departing from the scope of this disclosure. All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments. Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. It is intended that all matter contained in the above description or shown in the accompanying drawings shall be interpreted as illustrative only and not limiting. Changes in detail or structure may be made without departing from the invention as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While one or more particular embodiments have been shown and described, it will be understood by those of skill in the art that various changes and modifications can be made without departing from the spirit and scope of the present teachings.

What is claimed is:

1. An assembly for damping the movement of a device, the assembly comprising:
    a vessel configured to store an energy dissipating material;
    a seal configured to engage the vessel and retain the energy dissipating material within the vessel;
    wherein the seal includes a plate that is configured to engage the vessel; the seal comprises rubber; the plate is metal and at least partially encompassed within the seal; the vessel includes a first flange that is configured to engage a second flange that is at least partially encompassed within the seal; and the plate is axially offset from the second flange.

2. The assembly of claim 1, wherein the seal includes a sealing surface configured to engage and deform against at least an inner radial surface of the vessel.

3. The assembly of claim 2, wherein the seal includes a flange that is configured to engage a flange of the vessel; and the flange of the seal and the flange of the vessel include corresponding holes configured for connecting the vessel to an engine.

4. The assembly of claim 1, wherein the energy dissipating material further comprises a plurality of particles; and the plurality of particles include a first type of particle and second type of particle.

5. The assembly of claim 4, wherein the energy dissipating material further includes a gaseous portion.

6. The assembly of claim 1, wherein the seal is substantially planar.

7. An assembly comprising:
    a vessel configured to receive a predetermined volume of at least one energy dissipating material; and
    a seal configured to engage at least a portion of the vessel to retain the energy dissipating material within the vessel;
    wherein the vessel includes a first flange for engaging at least a portion of the seal; the seal includes a second flange for engaging at least a portion of the vessel; the first flange extends radially outward from the vessel; the seal comprises rubber; the seal includes a plate that is configured to engage the vessel; and the plate is axially offset from the second flange.

8. The assembly of claim 7, wherein the plate is at least partially encompassed within the seal and the second flange is at least partially encompassed within the seal; and outer dimensions of the plate are smaller than inner dimensions of the vessel such that the plate is configured to be disposed within the vessel.

9. The assembly of claim 7, wherein the seal includes a deformable sealing surface that engages at least an inner radial surface of the vessel to retain the energy dissipating material within the vessel.

10. The assembly of claim 7, wherein the vessel is substantially full of the energy dissipating material.

11. The assembly of claim 10, wherein the energy dissipating material includes a plurality of particles; the plurality of particles includes a first type of particle and second type of particle; the first type of particle includes a spherical configuration; and the second type of particle includes a cylindrical configuration.

12. The assembly of claim 7, wherein the vessel includes an open side and the seal completely covers the open side of the vessel to retain the energy dissipating material within the vessel.

* * * * *